INVENTOR.
HERBERT W. WESTEREN
BY
Salter & Michaelson
ATTORNEYS

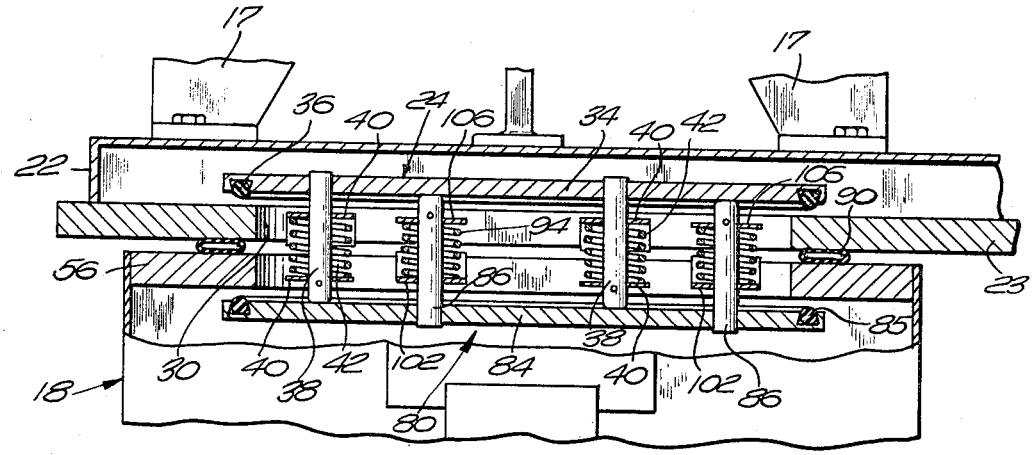
FIG. 3
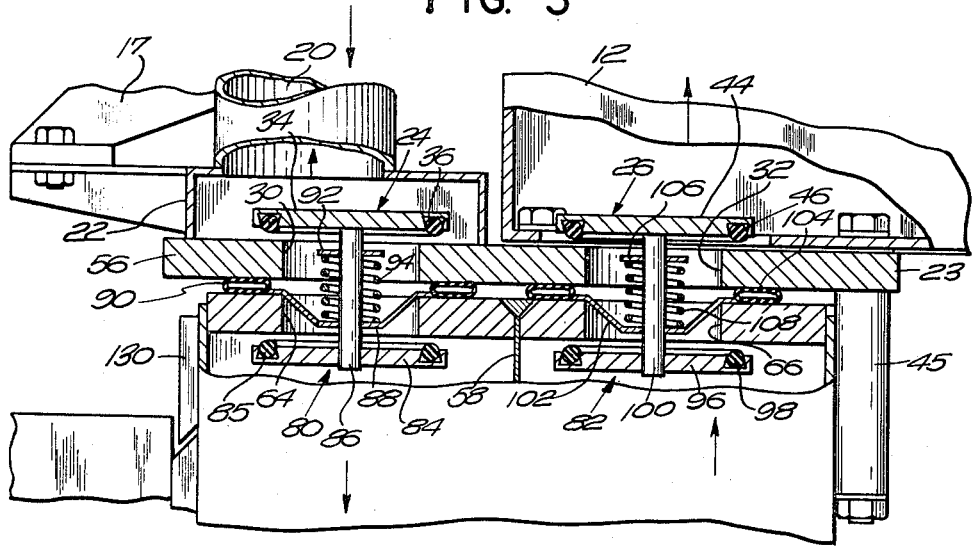
FIG. 4
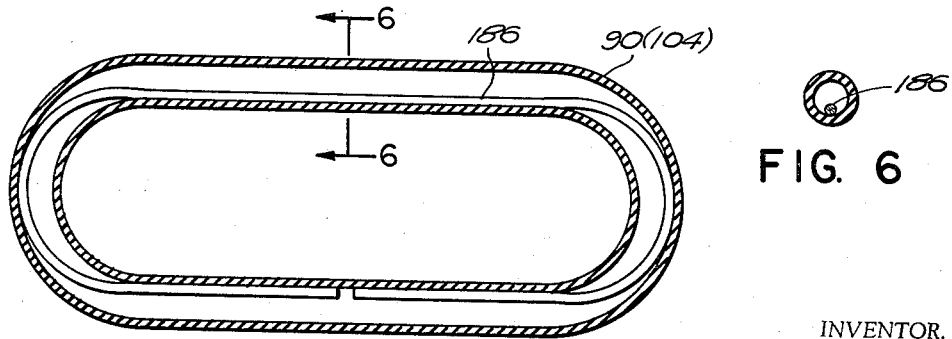
FIG. 5
FIG. 6
INVENTOR.
HERBERT W. WESTEREN
BY
*Salter & Michaelson*
ATTORNEYS INVENTOR.
HERBERT W. WESTEREN
BY
Salter & Michaelson
ATTORNEYS INVENTOR.
HERBERT W. WESTEREN
BY
Salter & Michaelson
ATTORNEYS

United States Patent Office 3,384,976
Patented May 28, 1968

3,384,976
APPARATUS FOR TREATING AN ATMOSPHERE
AND A REMOTE REGENERATOR THEREFOR
Herbert W. Westeren, Barrington, R.I., assignor to C. I.
Hayes Inc., Cranston, R.I., a corporation of Rhode
Island
Filed Dec. 21, 1965, Ser. No. 515,301
19 Claims. (Cl. 34—80)

ABSTRACT OF THE DISCLOSURE

Apparatus for conditioning articles in a work unit through which an atmosphere is circulated, an adsorption chamber being removably secured to the work unit for communication therewith and for treating the atmosphere circulating therein for removing moisture and impurities from said atmosphere, and means located remote from said work unit and to which a saturated adsorption chamber is transferred for the regeneration thereof.

---

The present invention relates to apparatus for treating an atmosphere and a remote regenerator therefor. More particularly, the present invention relates to apparatus that is employed in the drying of an atmosphere that is circulated within a work unit enclosure and further relates to the apparatus and means by which the unit employed for drying the atmosphere is regenerated.

The present invention has particular application for use with a work unit enclosure or environmental chamber normally referred to as a dry box. Dry boxes are employed in certain industrial assembly operations which require environments that are free of contamination during the assembly procedure. In the use of such dry box equipment, the operator works through gloved ports and assembles the equipment in the dry box, the interior of which is maintained under controlled atmospheric conditions.

The apparatus in the present invention provides for recirculating a conditioned atmosphere in the dry box by locating a drying or desiccant chamber in communication therewith, the desiccant chamber establishing a recirulating system with the dry box that removes moisture and impurities from the recirculating atmosphere prior to the introduction thereof into the dry box. One of the features of the present invention is the use of special valve assemblies that are automatically actuated upon securement of the desiccant chamber to the dry box unit, thereby establishing communication between the dry box and the desiccant chamber.

Because of the controlled conditions under which the dry box is operated, the adsorption or desiccant chamber may be located on stream for a considerable period of time and as long as a week or two weeks. For this reason, it is not necessary to provide for continuous regeneration of the drying agent located in the desiccant chamber since this drying agent will not become saturated in the usual time normally experienced in the operation of adsorption or desiccant chambers. Thus, it is not necessary to employ regeneration equipment in close proximity to the on-stream chamber for beginning regeneration of the chamber immediately upon the removal thereof from connection with the dry box. Such equipment as previously employed is illustrated in Patent No. 2,979,828 and 3,164,452. In these prior known systems, at least two drying chambers were employed in the apparatus, each chamber being alternately placed on stream while the other chamber was being regenerated. Even though these prior systems were efficient in operation, the initial costs thereof were sometimes prohibitive. Further, it is understood that the alternate chamber systems as illustrated in the above-mentioned patents were required because of the short time each drying or adsorption chamber could be maintained on stream before the drying agent or desiccant material located therein became saturated.

Since the environment in which the desiccant chamber in the present invention is employed does not quickly saturate the drying agent therein, immediate regeneration is not required after saturation because the replacement chamber will remain on stream for a relatively long period of time. Thus, the saturated chamber can be removed from engagement with the dry box and transferred to a remote area for regeneration by the unique regenerating unit embodied in the present invention. The regenerating cycle as carried out by the regenerating unit is approximately four hours, and thus a chamber may be regenerated and stored for eventual use, and need not be immediately returned to operation, as was previously required. Hence, in the present system, the novel drying or desiccant chamber is provided with suitable valve assemblies that enable the drying chamber to be effectively sealed when not in use, the chamber being placed either on stream or in the regenerating station with a minimum of work operations.

Accordingly, it is an object of the present invention to provide apparatus for treating an atmosphere and to a remote regenerator therefor that is simple in operation and effective in the manner of use thereof.

Still another object is to provide a desiccant or adsorption chamber for use in treating an atmosphere that includes novel valve assemblies that are automatically actuated upon placement of the chamber in operation or upon removal of the chamber from the operating position.

Still another object is to provide a regenerating unit for use with a desiccant chamber that is especially constructed for efficiently producing regeneration of the drying agent located in the chamber.

Another object of the present invention is to provide equipment for removing moisture from an atmosphere having low operational costs and excellent operating characteristics.

Other objects, features and advantages of the invention will become apparent as the description thereof proceeds when considered in connection with the accompanying illustrative drawings.

In the drawings which illustrate the best mode presently contemplated for carrying out the present invention:

FIG. 3 is an enlarged sectional view showing the valve assemblies of the work unit and adsorption chamber illustrated in FIG. 1 and after the chamber has been mounted on the work unit;

FIG. 4 is an enlarged sectional view showing the work unit and adsorption chamber valve assemblies as illustrated in FIG. 2 and after the chamber has been mounted in position on the work unit;

FIG. 5 is a sectional view of a sealing gasket that is used in conjunction with the desiccant chamber valve assemblies illustrated in FIGS. 3 and 4;

FIG. 6 is a sectional view taken along lines 6—6 in FIG. 5;

Figure 1:
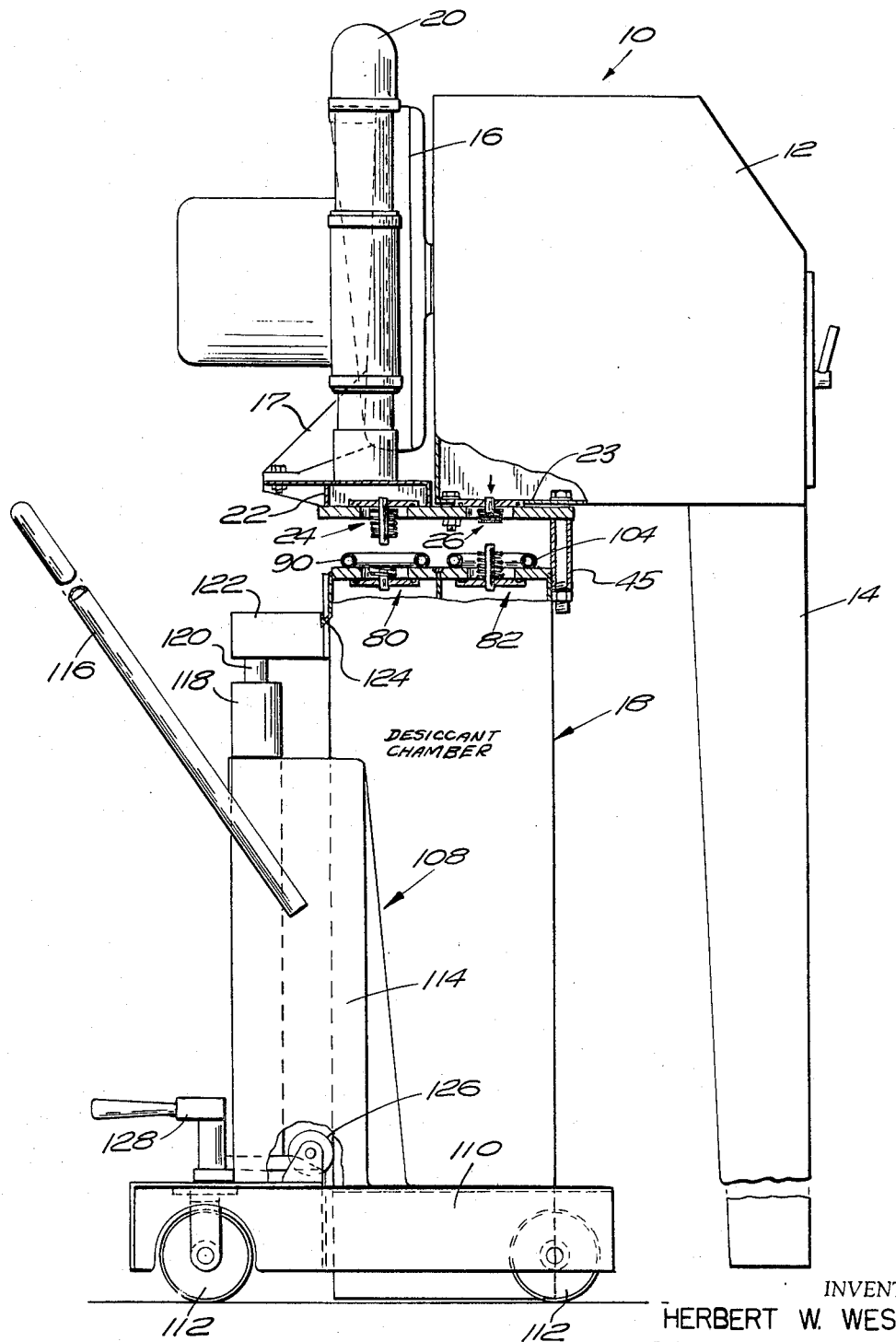
FIG. 1 is a side elevational view with parts shown in section of a work unit, and further illustrates the location of an adsorption chamber as carried by a transfer cart prior to the mounting of the chamber on the work unit.
Figure 2:
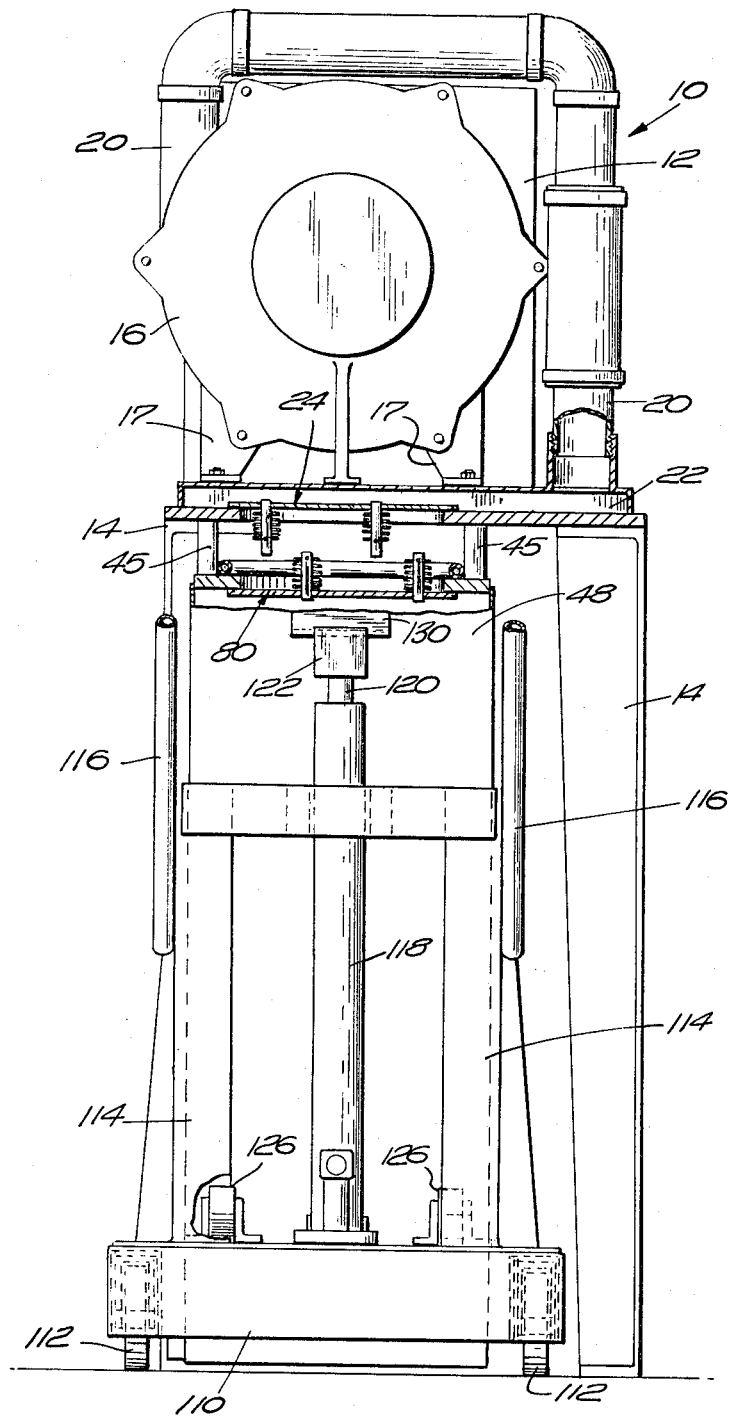
FIG. 2 is a front elevational view with parts shown in section of the work unit and the adsorption chamber carried by the transfer cart as illustrated in FIG. 1.

Referring now to the drawings and particularly to FIGS. 1 and 2, the apparatus as embodied in the present invention includes a work unit generally indicated at 10 which is defined by an enclosure or housing 12, generally referred to as a dry box, the dry box 12 being mounted on vertical standards 14. The dry box 12 defines a container in which articles are assembled or processed in a conditioned atmosphere so that the assembly procedure may be carried out in the absence of moisture and impurities. In this connection, the operators working in conjunction with the dry box 12 insert their hands through gloved ports and in this manner carry on the working procedure interiorly of the container 12 while physically remaining exterior thereof.

Communicating with the interior of the dry box 12 is a blower 16 mounted on braces 17 and that is adapted to direct the conditioned atmosphere from the dry box 12 for recirculation therethrough by way of an adsorption or desiccant chamber 18. The dry box 12 communicates with the desiccant chamber 18 through the blower 16, a duct defined by piping 20 and a manifold 22. The atmosphere is circulated through the chamber 18 for conditioning, as will be described, and is recirculated to the dry box 12. As shown in FIG. 2, the braces 17 on which the blower 16 is mounted are secured to the manifold 22 which, in turn, is mounted on a work unit adaptor plate 23. The adaptor plate 23 is fixed to the upper end of the standards 14 and, as will be described, includes valve assemblies that cooperate with valve assemblies in the desiccant chamber 18 to provide for circulation of the atmosphere through the system.

In order to control the flow of the conditioned atmosphere to and from the dry box 12, valve assemblies generally indicated at 24 and 26 are provided for the work unit, and, as illustrated in FIGS. 3 and 4, are adapted to control the flow of the atmosphere through the adaptor plate 23. The adaptor plate 23 is formed with ports 30 and 32, the port 32 communicating with the interior of the dry box 12 and the port 30 communicating with the manifold 22. As illustrated particularly in FIGS. 3 and 4, the valve assembly 24 includes an elongated gate 34 that is adapted to control flow of the atmosphere from the dry box 12 by way of the port 30 into the chamber 18. A sealing ring 36 is located in a groove on the underside of the gate 34 and is adapted to engage the upper surface of the adaptor plate 23 when the valve assembly 24 is disposed in the sealing position on the plate 23.

Joined to the gate 34 and located in spaced relation therein are stems 38 which are interconnected through straps 40 to springs 42, the straps 40 cooperating with the springs 42 to normally locate the valve plate 34 in the closed position thereof. The valve assembly 26 is constructed similarly to the valve assembly 24 and includes a gate 44 in which sealing rings 46 are located, the gate 44 being adapted to control flow of the atmosphere through the port 32. Although not seen in the view illustrated in FIGS. 3 and 4, the valve assembly 26 also includes spaced valve stems that are joined to the gate 44, these stems being interconnected to springs that normally retain the gate 44 in the closed position thereof. As will be described, the valve assemblies 24 and 26 are adapted to be automatically actuated for movement of the gates 34 and 44 to the open position thereof upon mounting of the adsorption or desiccant chamber 18 on the work unit 12. Also fixed to the adaptor plate 23 and projecting downwardly therefrom are elongated stops 45 that are adapted to receive the desiccant chamber 18 thereagainst for properly locating the chamber when it is to be mounted on the work unit adaptor plate 23.

Figure 14:
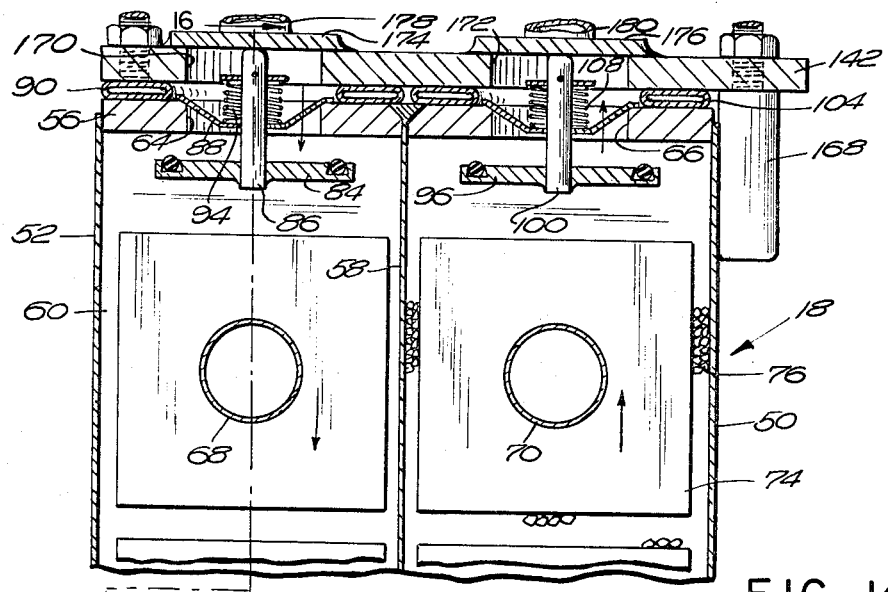
FIG. 14 is a sectional view taken along lines 14—14 in FIG. 10 showing the adsorption chamber valve assemblies in the open position thereof.
Figure 14:
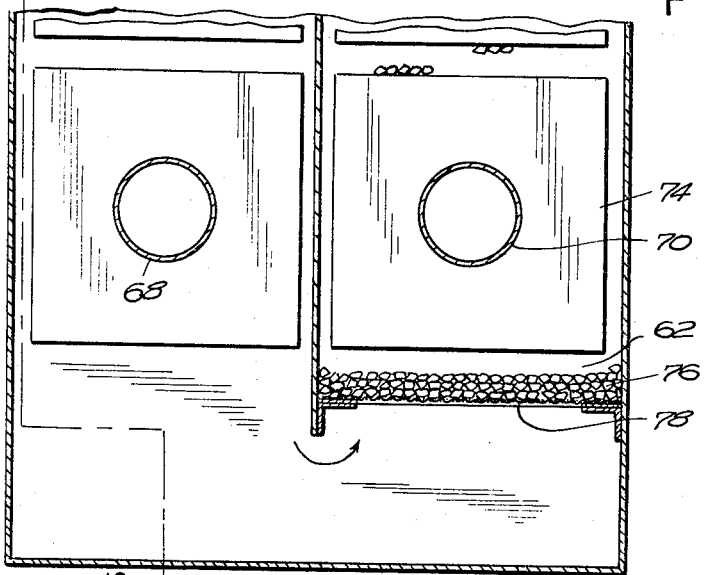
Figure 15:
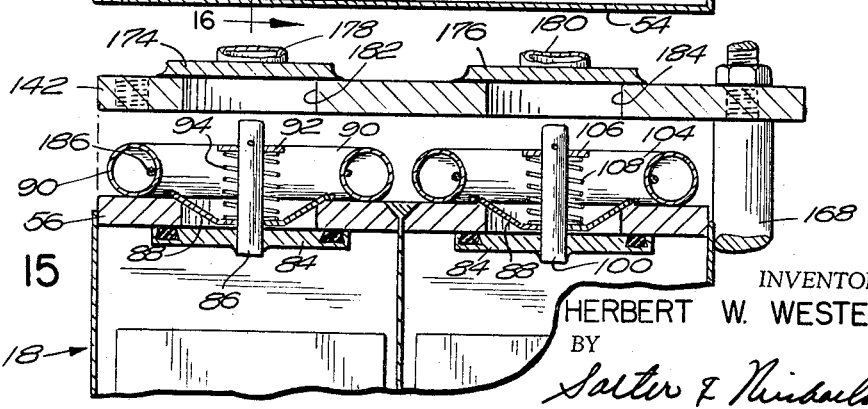
FIG. 15 is a fragmentary sectional view similar to FIG. 14 and showing the adsorption chamber valve assemblies in the closed position thereof.
Figure 16:
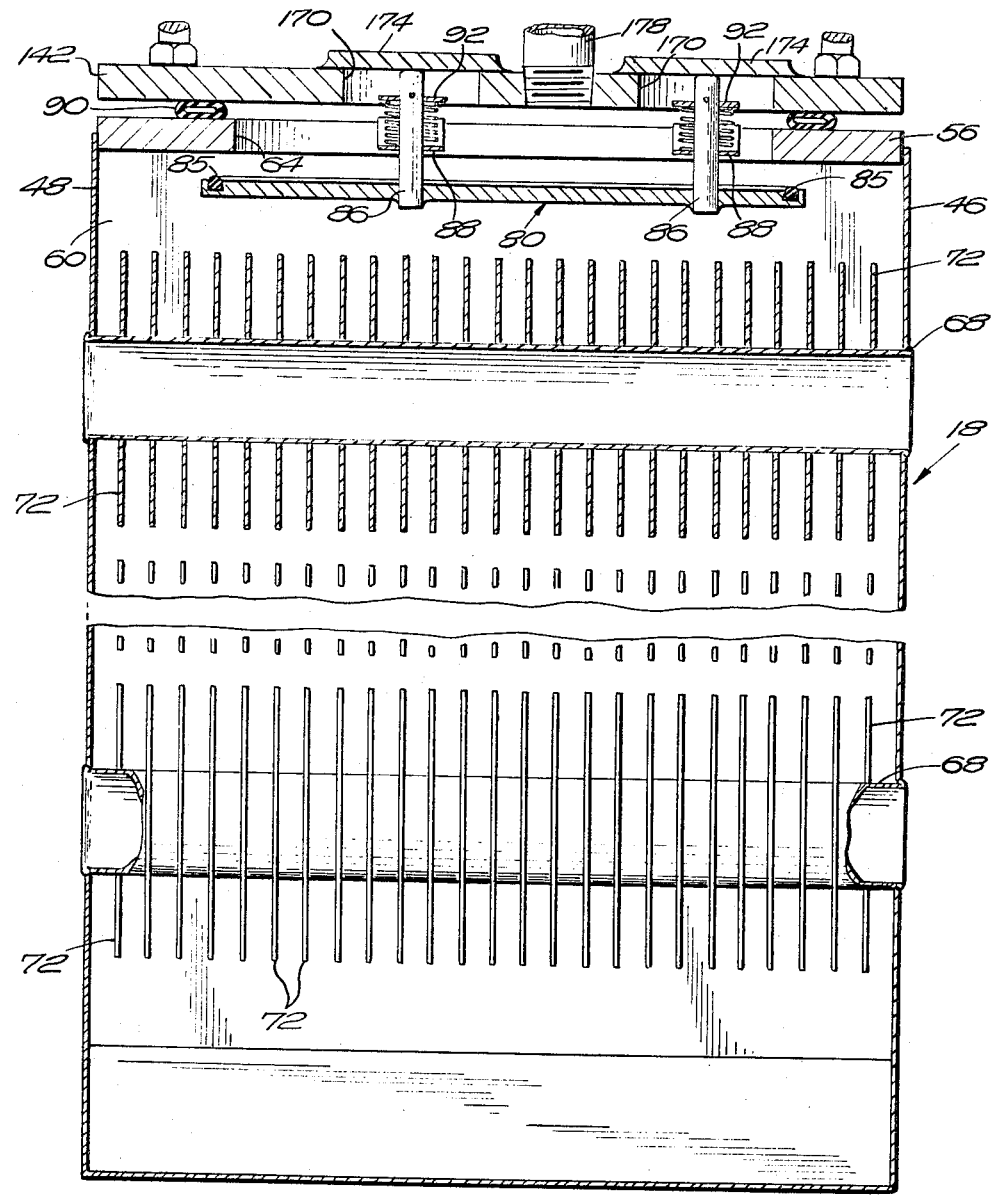
FIG. 16 is a sectional view taken along lines 16—16 in FIG. 14.

Referring now to FIGS. 14, 15 and 16, the desiccant chamber 18 is illustrated in detail and includes a housing defined by a front wall 46, a rear wall 48, side walls 50 and 52, a bottom wall 54, and a top flange 56. Located interiorly of the adsorption chamber 18 is a baffle 58 that is fixed to the top flange 56 and extends downwardly therefrom intermediate the side walls 50 and 52 but spaced from the bottom wall 54. The baffle 58 thus divides the adsorption chamber into a first compartment indicated at 60 and a second compartment indicated at 62. As shown in FIG. 14, the upper flange 56 is formed with an opening or port 64 therein that communicates with the compartment 60, while a similar port 66 is formed in the flange 56 and communicates with the compartment 62. When the adsorption or desiccant chamber 18 is mounted in position on the work unit 10, the port 64 is adapted to communicate with the manifold 22 through the port 30, the port 66 communicating with the interior of the dry box 12 through the port 32 of the plate 23. Thus, flow of the atmosphere that passes from the work unit 10 for reconditioning in the desiccant chamber 18 moves through the blower 16, the duct 20, manifold 22, port 30, port 64, compartment 60, compartment 62, port 66, port 32, and then into the interior of the dry box 12 for circulation therein.

Figure 11:
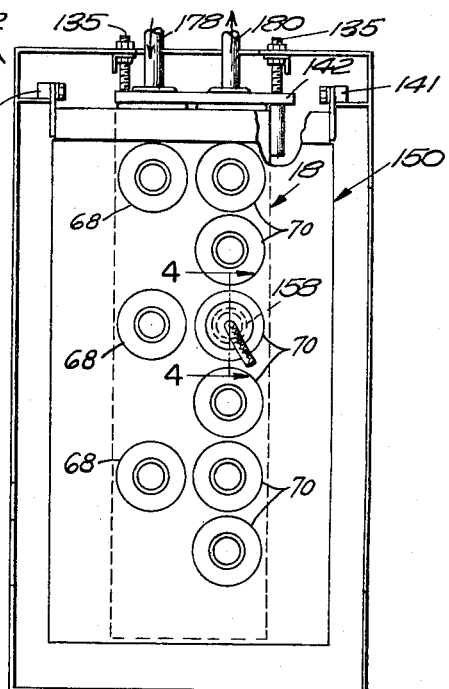
FIG. 11 is an end elevational view of FIG. 10.
Figure 12:
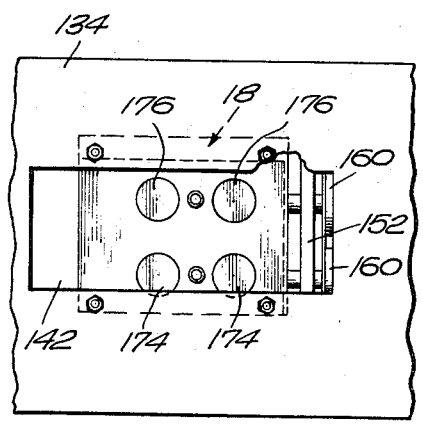
FIG. 12 is a top plan fragmentary view of the apparatus illustrated in FIG. 10.

Located in the compartments 60 and 62 of the chamber 18 are a plurality of tubes 68 that extend through the compartment 60 in spaced relation, and tubes 70 that extend through the compartment 62 in spaced relation. As shown in FIGS. 14 and 16, the tubes 68 have a plurality of spaced fins 72 mounted thereon for removing the heat of compression of the circulating atmosphere, while the tubes 70 are similarly formed and are provided with a plurality of fins 74 in spaced relation thereon. As will be described, the fins 74 are adapted to conduct heat into and out of the drying agent or desiccant bed located in the chamber 62. As seen in FIG. 11, only three of the tubes 68 are located in the compartment 60, while six of the tubes 70 are mounted in the compartment 62. The unequal distribution of the tubes 68 and 70 is provided since the drying agent indicated as a desiccant bed 76 in FIG. 14 is located only in the compartment 62 and rests on a screen 78 at the bottom of the compartment 62, the remainder of the compartment 62 being filled by the desiccant bed substantially to the top thereof. The atmosphere as introduced into the chamber 18 thus flows downwardly through the relatively open compartment 60 for free movement therein and then upwardly through the drying agent or desiccant bed 76 as located in the compartment 62 for removal of moisture and impurities therefrom.

The interior of the desiccant chamber 18 is normally sealed when not on stream or at the regenerating station, and for this purpose, the chamber 18 is provided with valve assemblies generally indicated at 80 and 82. As shown in FIGS. 3, 4, 14 and 15, the valve assembly 80 is constructed similarly to the valve assemblies 24 and 26 and includes a gate 84 in which O ring seals 86 are located, the gate 84 being adapted to normally seal the port 64. Joined to the gate 84 in spaced relation are valve stems 86 to which metal straps 88 are joined, the metal straps having a modified U configuration and including flanges that are received on the upper surface of the flange 56. An enlarged hollow resilient sealing gasket 90 surrounds the port 64 and receives the flanges of the strap 88 thereunder. Spring stop plates 92 are also fixed to the stems 86 and cooperate with the metal straps 88 to receive springs 94 therebetween. It is seen that the springs 94 normally retain the gate 84 in the upper position thereof so that it sealingly engages the underside of the flange 56 of the chamber 18, thereby sealing the port 64 and the interior of the compartment 60. The valve assembly 82 is constructed similarly to the valve assembly 80 and includes a gate 96 in which a seal 98 is fixed, spaced stems 100 being secured to the valve plate 96 and extending upwardly with respect thereto. Straps 102 are joined to the stems 100 and engage the undersurface of the plate 64. An enlarged flexible tubular sealing gasket 104 is disposed around the port 66 and receives the flanges of the straps 102 thereunder. Spring stop members 106 are secured to the stems 100 and cooperate with the straps 102 to receive springs 108 therebetween. It is seen that the springs 108 normally retain the gate 96 in the closed position thereof and are compressed to permit opening of the gate 96 when the desiccant or adsorption chamber 18 is located in the position of use on the work unit 10.

When the chamber 18 is mounted on the work unit 10, suitable clamps located thereon receive bolts for clamping the chamber 18 in a vertical position, as illustrated in FIGS. 1 and 2. Upon movement of the chamber 18 in adjacent relation to the work unit 10, the large sealing gaskets 90 and 104 are first contacted by the work unit adaptor plate 23, thereby sealing the ports 30, 32 and 64, 66 prior to opening of the valve assemblies 24, 26 and 80, 82 associated with these ports. As the chamber 18 is clamped in the upper position thereof to the adaptor plate 23, the stems 38 of the valve assembly 24 engage the underside of the gate 84, while the stems 86 engage the underside of the gate 34. Similarly, the stems of the gate 44 engages the underside of the gate 96, and the stems 100 of the valve assembly 82 engages the underside of the gate 44. The valve assembly springs are calibrated so as to be balanced, each of the gates defining an abutment for the opposite stems, which overcome the action of the springs to cause the gates to lift from their stated position as illustrated in FIGS. 3 and 4. When the chamber 18 is secured to the adaptor plate 23, the gaskets 90 and 104 are squeezed, as illustrated in FIGS. 3 and 4, to form a tight seal around the ports located in the adaptor plate 23 and flange 56 of the desiccant chamber 18. With the chamber 18 mounted as illustrated, flow for the conditioning atmosphere is established from the dry box 12 to the blower 16, duct 20, manifold 22, compartment 60, compartment 62 and back to the dry box 12 as indicated by the arrows in FIG. 4.

In order to locate the desiccant chamber 18 in the operating position on the work unit 10 and further for transferring the desiccant chamber 18 to a regenerating station, to be described, a mobile transfer truck generally indicated at 108 is provided and, as shown in FIGS. 1 and 2, includes a base 110 on which wheels 112 are mounted in any convenient manner. Located between vertical standards 114 that are mounted on the base 110, and to which a handle 116 is secured, is a power cylinder 118 in which a piston rod 120 is received for vertical movement therein. A lift adaptor 122 is fixed to the upper end of the piston rod 120 and is formed with a lift detent 124 on the outer edge thereof (see FIG. 4). Rollers 126 are mounted on the base 10 and define stops for the lower portion of the chamber 18 when it is located on the mobile transfer unit 108. Referring again to FIG. 1, a control member 128 is mounted on the base 110 below the cylinder 118 and is manually controlled by the operator of the apparatus for controlling movement of the piston rod 120. The control member 182 is thus manipulated to move the desiccant chamber 18 into the position of use on the work unit 10 and for further withdrawing the chamber 18 from engagement with the work unit 10 for movement to a regenerating station. It is seen that in use of the transfer unit 108, the lift adaptor 122 is moved under a lift finger 130 fixed to the side wall 52 of the desiccant chamber 18 for lifting the chamber 18, the lower portion of the side wall 52 engaging the rollers 126 of the transfer unit. Vertical movement of the piston rod 120 and adaptor 122 mounted thereon will move the chamber 18 into the position of use as illustrated in FIGS. 3 and 4. As previously mentioned, the stops 45 act as guides for the chamber 18 for locating it in the position of use on the adaptor plate 23.

Figure 7:
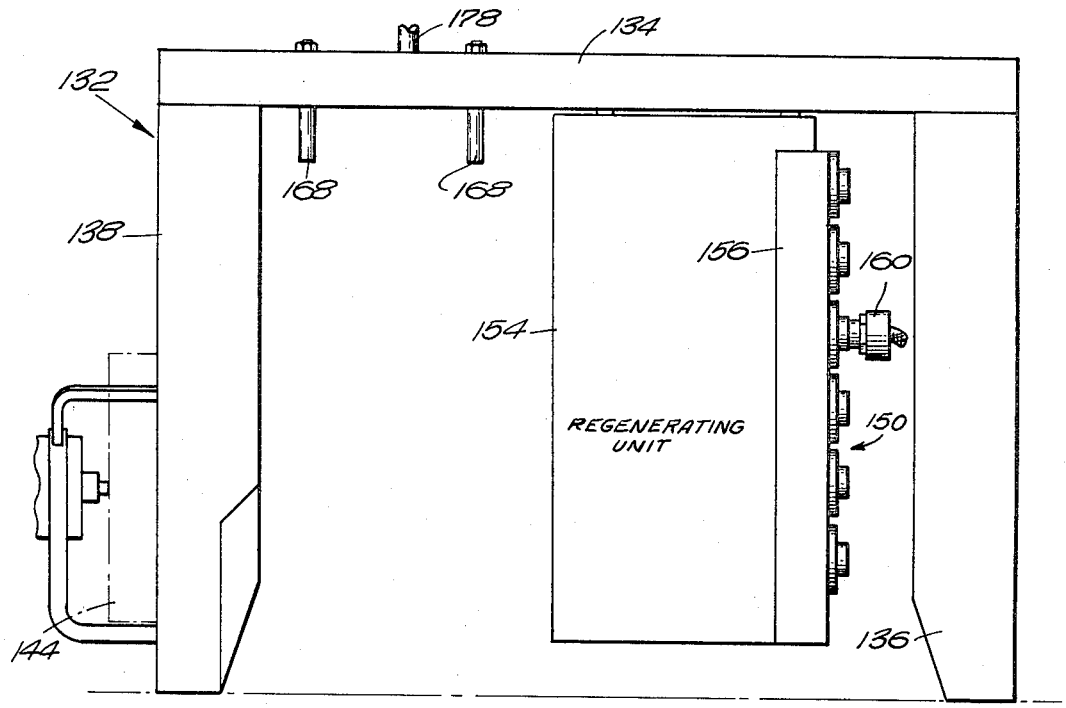
FIG. 7 is a front elevational view of the regenerating assembly in which a desiccant chamber is adapted to be mounted for the regeneration thereof.
Figure 8:
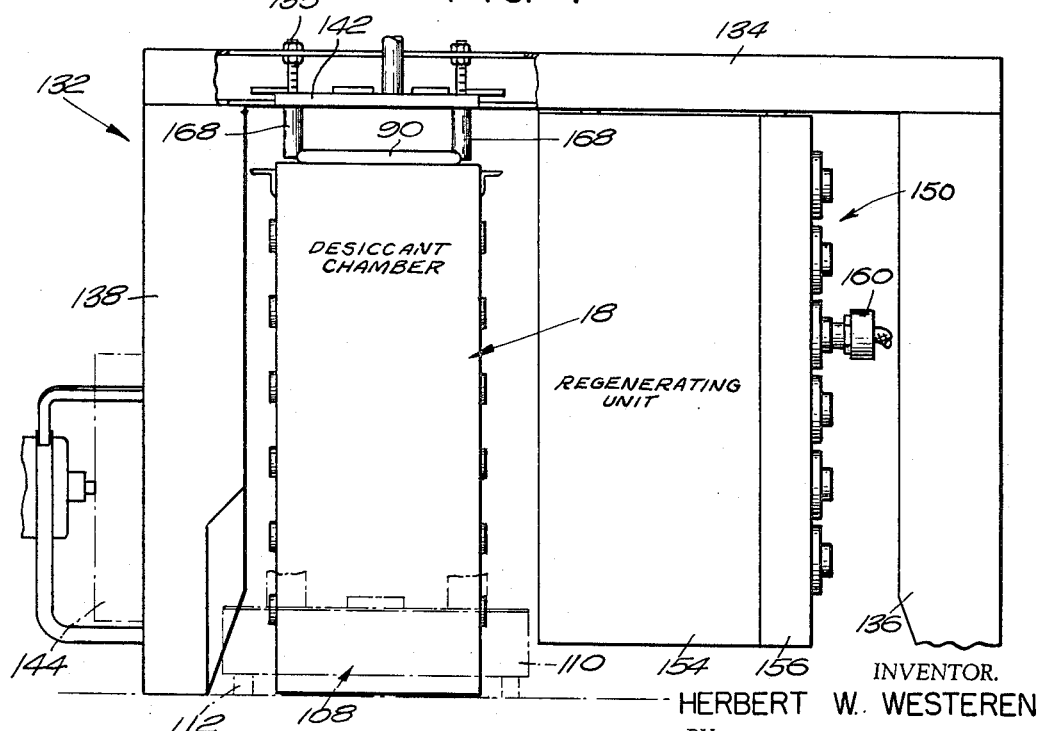
FIG. 8 is a front elevational view of the regeneration assembly illustrated in FIG. 7 and showing the location of an adsorption chamber prior to the mounting thereof on the frame of the assembly.
Figure 9:
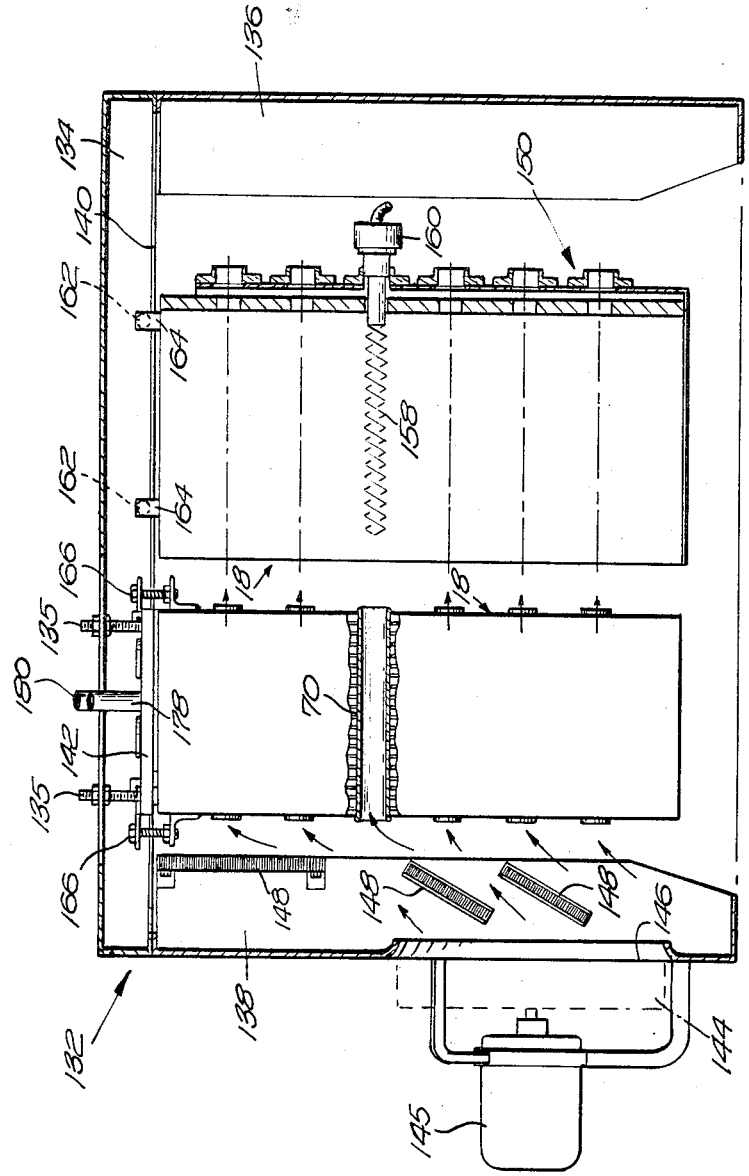
FIG. 9 is a sectional view of the apparatus illustrated in FIG. 8 with parts shown in elevation and showing the adsorption chamber mounted in position on the frame of the regeneration assembly prior to movement of the regenerating unit into engagement therewith.

After the desiccant chamber has been on stream with the dry box 12 for a period of time, the desiccant bed or drying agent 76 as located in the compartment 62 becomes saturated and must be regenerated. At this time, the chamber 18 is unbolted from the adaptor plate 23 and is removed from engagement with the work unit 10 by the transfer unit 108 for removal to a regenerating station that is located remote from the work unit 10. Referring now to FIGS. 7, 8 and 9, a regenerating assembly generally indicated at 132 is located at the regenerating station and includes a frame enclosure defined by an upper support 134 that is supported by vertical support members 136 and 138. Spaced tracks 140 are located interiorly of the frame 134, while a regenerator adaptor plate 142 is suspended from the frame 134 by bolts 135 and is located intermediate the tracks 140. A fan 144 driven by a motor 145 is mounted on the vertical support member 138 and is adapted to direct air through an opening 146 into the enclosure defined by the upper support 134 and support members 136 and 138. Baffles 148 are fixed to the support member 138 and direct cooling air from the fan 144 toward a desiccant chamber 18 that is mounted in the frame, as will be described.

Figure 13:
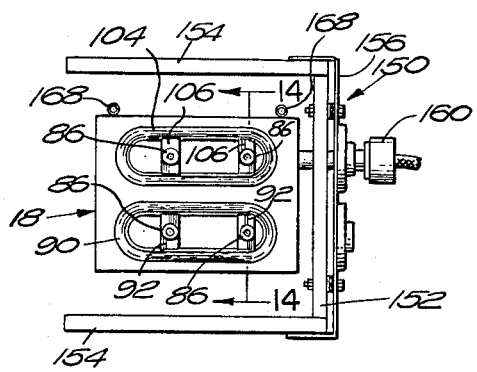
FIG. 13 is a sectional view taken along lines 13—13 in FIG. 10.

Located at the regenerating station and mounted on the frame for movement thereon is a regenerating unit generally indicated at 150. Referring to FIG. 13, the regenerating unit is shown including a U frame defined by a front panel 152 and side panel 154. Secured to the front panel 152 is a mounting plate 156 in which a plurality of heating elements 158 are secured. The heating elements extend through suitable openings formed in the plate 156 and panel 152 and project between the side panels 154 in spaced vertical relation. Terminals 160 are joined to the outer ends of the heating elements 158 and are suitably electrically interconnected to a source of current. The heating elements 158 are positioned in the regenerating unit 150 in such a manner as to be received within the tubes 70 of the desiccant chamber 18 to be regenerated, the tubes 70 in the chamber 18 being dimensioned for just accommodating the heating elements 158 therein. As shown in FIG. 9, the uppermost ends of the side panels 154 of the regenerating unit 150 are provided with rollers 162 that are mounted on brackets 164, the rollers 162 being received on the tracks 140 for rolling movement thereon.

When the desiccant chamber is removed from engagement with the work unit 10, the valve assemblies 24, 26 and 80, 82 automatically close to seal the chamber. The chamber is then transferred on the mobile transfer unit 108 to the regenerating station. The chamber 18 is lifted by the transfer unit 108 from the position shown in FIG. 8 for engagement with the regenerating adaptor plate 142 and is bolted in position by the bolts 166 to the adaptor plate 142, as seen in FIG. 9.

As further seen in FIGS. 7 and 8, stops 168 are mounted on the adaptor plate 142 and properly locate the chamber 18 when it is moved to the elevated position for securement to the adaptor plate. Referring now to FIGS. 14, 15 and 16, the regenerating adaptor plate 142 as shown is formed with openings 170 and 172 that are capped by abutment plates 174 and 176, respectively. Extending through the plate 142 are spaced pipes 178 and 180, the pipe 178 extending between the openings 170 formed in the plate 142, and the pipe 180 extending between the openings 172 formed in the plate 142. As shown in FIG. 14, the pipes 178 and 180 are adapted to be aligned with the ports 64 and 66 of the chamber 18, communication between the ports of the chamber 18 and the pipes 178 and 180 establishing communication between the pipes and the compartments 60 and 62, respectively, during the regeneration cycle.

When the chamber 18 is clamped to the plate 142 by the bolts 166, the stems 86 and 100 of the valve assemblies 80 and 82 engage the abutment plates 174 and 176, respectively, and the gates 84 and 96 are thereby moved to the open position thereof, as seen in FIG. 16. Prior to the movement of the valve assemblies 80 and 82 to the open position thereof, the flange 56 of the chamber 18 has been moved into close proximity to the adaptor plate 142, thereby compressing the large flexible gaskets 90 and 104 to effectively seal the interior of the chamber 18 before the stems of the gates 84 and 96 engage the abutment plates 174 and 176. As seen in FIG. 4, the large gaskets 90 and 104 are provided with interior wire elements 186 that are adapted to maintain the shape of the tubular gaskets and further provide for return to the original shape thereof upon release from the compressed position.

Figure 10:
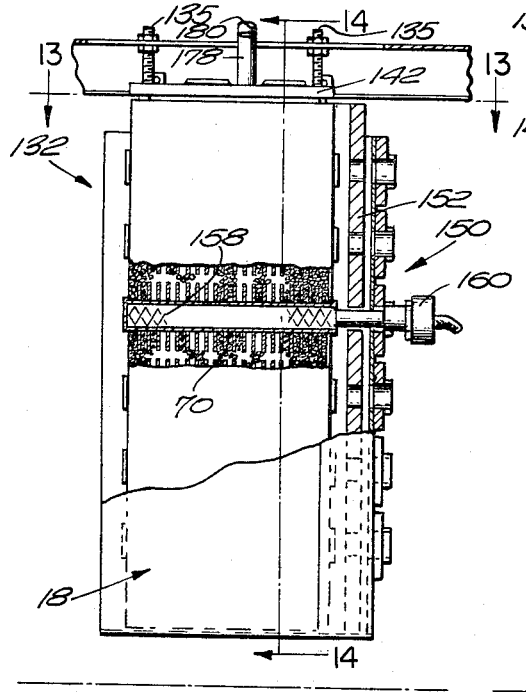
FIG. 10 is a front elevational view with parts shown in section of the adsorption chamber as mounted on the regeneration assembly in engagement with the regenerating unit, a heating element of the regenerating unit being shown as it is located in a tube of the adsorption chamber during the regenerating cycle.

During the regenerating cycle, the regenerating unit 150 is moved into the position illustrated in FIG. 10, wherein the heating elements 158 are received within the tubes 70 of the desiccant chamber 18. Heat from the heating elements 158 is thus conducted through the tube 70 and fins 74 into the chamber 62 for heating the desiccant bed 76. Since the ports 64 and 66 are open for communication with the pipes 178 and 180 when the chamber 18 is located at the regeneration station, a purge gas is introduced into the pipe 180 for circulation through the compartments 62 and 60 as indicated by the arrows in FIG. 14. The pipe 178 defines an exhaust duct and directs the purge gas from the compartment 60 to a suitable vent. It is understood that the regeneration cycle may be instituted by electrical controls that will automatically operate the heating elements and control suitable solenoid operated valves that will direct the purge gas through the pipe 180 and into the chamber 18. After the interior of the chamber 18 is conditioned by the heating elements 158 and the purge gas, cooling air is directed from the fan 144 toward the chamber 18, the cooling air being deflected by the baffles 148 through the tubes 68 and 70 as indicated by the arrows in FIG. 9. After a suitable period of heating and cooling, preferably about four hours, the desiccant material in the chamber 18 is regenerated, and the chamber 18 may be then removed from the regenerating station and thereafter located in a storage area. It is understood that as soon as the desiccant chamber 18 is removed from the adaptor plate 142 of the regenerating assembly, the valve assemblies 80 and 82 will be automatically closed to seal the compartments 60 and 62.

In operation of the apparatus, it is first assumed that the desiccant chamber 18 is to be mounted on the work unit 10 and placed on stream therewith for recirculating an atmosphere through the dry box 12. The chamber 18 is lifted in position by the mobile transfer unit 108, the stop 45 positively locating the chamber 18 with respect to the work unit adaptor plate 23. When the chamber 18 is bolted into position to the adaptor plate 23, the valve assemblies 24 and 26 of the work unit and 80 and 82 of the chamber are opened to establish communication between the work unit and the chamber 18. The blower 16 provides for continuous circulation of the atmosphere through the container 18 wherein the atmosphere is conditioned by the desiccant bed therein prior to returning to the dry box 12.

When the chamber 18 is to be regenerated, it is removed from its bolted position on the work unit 10 by the mobile transfer unit 108 and transferred to the remote regenerating station, at which station it is bolted to the regenerating adaptor plate 142 of the assembly 132. Stops 168 positively locate the chamber 18 relative to the adaptor plate 142, and upon the bolting of the chamber to the plate 142, the valve assemblies 80 and 82 are moved to the open position to establish communication between the interior of the chamber 18 and the pipes 178 and 180. The regenerating unit 150 is then rolled on the tracks 140 from the position illustrated in FIG. 9 to the position illustrated in FIG. 10, wherein the heating elements 158 are received within the tubes 70. The regeneration cycle is then begun, current being supplied to the heating elements 158 and a purge gas being directed into the pipe 180 for circulation into the compartment 62, compartment 60, and outwardly through the pipe 178. After heating and purging, the fan 144 directs cooling air through the tubes 68 and 70 for cooling the chamber 18. After the regenerating cycle has been completed, the chamber 18 is removed from engagement with the adaptor plate 142 and is then withdrawn from the regenerating station by transfer unit 108 for movement to a storage area.

It is seen that the present invention provides a unique system whereby the interior of the disiccant chamber is always closed except when on stream or when being regenerated. The large gaskets 90 and 104 insure that the interior of the chamber 18 is sealed before the valve assemblies 80 and 82 are opened, thereby insuring that the chamber is absolutely dry. Further, the check valve arrangement prevents the chamber from being exposed to the atmosphere. The regenerating cycle is carried out without the requirement of complicated piping, controls and heat exchangers; and since one regenerating assembly can accommodate many chambers, a single regeneration station can service many recirculation systems, further reducing the overall cost of the equipment. Since the present invention eliminates the heretofore required piping, switch-over valves, etc., and employs relatively large ducts, the atmosphere may be recirculated at considerably lower pressures than heretofore known. The low pressure recirculation system also enables the system to function without a positive displacement and enables use of the centrifugal type blower, which further contributes to reducing the cost of the equipment.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. In apparatus for conditioning articles in a controlled atmosphere, a work unit through which the atmosphere is circulated, an adsorption chamber that is adapted to be removably secured to said work unit for communication therewith and for treating the atmosphere circulating therein for removing moisture and impurities from said atmosphere, valve assemblies located in said work unit and in said adsorption chamber and being normally closed to seal said chamber and unit, said valve assemblies being automatically moved to the open position upon securement of said adsorption chamber on said work unit, wherein flow between said chamber and unit is established.

2. In apparatus as set forth in claim 1, means located remote from said work unit at a regeneration station for regenerating said adsorption chamber, means for transferring said adsorption chamber from said work unit to said regeneration station, wherein said adsorption chamber is removably mounted on said regenerating means, means at said regenerating station cooperating with the valve assemblies located in said adsorption chamber for establishing communication between a source of purge gas and the interior of said adsorption chamber for the reconditioning thereof at said regeneration station, and means carried by said regenerating means and extending into said adsorption chamber for supplying heat to said adsorption chamber during the regeneration cycle.

3. In apparatus as set forth in claim 1, said adsorption chamber having an interior baffle located therein that divides said adsorption chamber into a first compartment through which the atmosphere flows in a downwardly direction and a second compartment communicating with said first compartment at the lower end thereof through which the atmosphere flows in and upwardly direction, a plurality of finned tubes extending laterally through said compartments and a drying agent located only in said second compartment and with which the atmosphere circulating through said adsorption chamber contacts, wherein moisture and impurities are removed from said atmosphere during on stream operation of said adsorption chamber.

4. In apparatus as set forth in claim 3, a port located at the upper end of each of said compartments, the valve assembly in said adsorption chamber including a valve that is located in each compartment for normally closing the port therein, spring means for normally moving said valves in said adsorption chamber to the closed position thereof, and sealing means surrounding said ports on the exterior sides thereof for sealing the flow paths of said atmosphere through said adsorption chamber and work unit when said adsorption chamber is mounted thereon.

5. In apparatus as set forth in claim 4, said work unit including inlet and exhaust ports that are adapted to communicate with the ports in said adsorption chamber, and spring members associated with the valve assemblies in said work unit and being operable to normally close the ports therein when the adsorption chamber is removed from engagement with said work unit.

6. In apparatus as set forth in claim 5, the spring means in said adsorption chamber and the spring members in said work unit being balanced to provide for opening of the valve assemblies in said chamber and unit when the adsorption chamber is removably mounted on said work unit.

7. In apparatus as set forth in claim 2, the means carried by said regenerating means for supplying heat to said adsorption chamber including a plurality of heating elements, said adsorption chamber including a plurality of finned tubes for receiving said heating elements during the regeneration cycle, wherein a drying agent located in said adsorption chamber is effectively regenerated.

8. In apparatus as set forth in claim 7, said regenerating means including a frame on which said adsorption chamber is mounted during the regeneration cycle, and a regenerating unit on which said heating elements are mounted, means for moving said regenerating unit on said frame for locating the heating elements in said finned tubes of said adsorption chamber.

9. In apparatus as set forth in claim 7, said adsorption chamber including an interior baffle that divides said adsorption chamber into a first compartment and a second compartment, said finned tubes being received in both said compartments but only said second compartment having the drying agent located therein, whereby said heating elements of said regenerating unit are received only in the tubes in said second compartment during the regeneration cycle.

10. In apparatus as set forth in claim 9, said regenerating unit further including means for circulating air through said compartments in the adsorption chamber during the regeneration cycle, the heat being generated by the heating elements and being conducted into said compartments by the finned tubes during a heating phase of the regeneration cycle, the air being circulated through said finned tubes during a cooling phase of the regeneration cycle, the circulating air cooperating with the heat generated by the heating elements to effectively regenerate the drying agent in the adsorption chamber.

11. In apparatus as set forth in claim 2, said transferring means including a mobile unit on which a lifting device is mounted, said adsorption chamber having a lift element secured thereto for engagement with said lifting device, wherein said adsorption chamber is removable from engagement with said work unit for transfer to said regeneration station for mounting on said regenerating means.

12. In apparatus as set forth in claim 1, said valve assembly in said adsorption chamber including at least one valve gate to which a valve stem is joined, a spring secured to said stem and being operable to normally locate the valve gate in an open position thereof, and an abutment in said work unit with which said valve stem engages, said valve stem being movable relative to said abutment upon elevation of said adsorption chamber into removable engagement with said work unit for moving the valve gate to the open position thereof.

13. In apparatus as set forth in claim 12, the valve assembly in said work unit including at least one valve gate to which a valve stem is joined, a spring secured to the stem of the work unit valve gate and normally locating the work unit valve gate in an opening position, the valve gate of said work unit defining the abutment for the stem of the adsorption chamber valve assembly and receiving the stem of the adsorption valve assembly in engagement therewith, the gate of the adsorption valve assembly receiving the stem of the work unit valve assembly thereagainst and defining the abutment therefor, said springs being balanced to provide for simultaneous movement of both valve gates to the open position when the adsorption chamber is mounted on said work unit.

14. In apparatus as set forth in claim 2, said regenerating means including a frame on which said adsorption chamber is mounted during the regeneration cycle, and a regenerating unit mounted on said frame and including a plurality of heating elements, said adsorption chamber having a plurality of finned tubes located therein, one set of said finned tubes normally removing the heat of compression of the circulating atmosphere and a second set of finned tubes located in said chamber for conducting heat into and out of a drying agent located in said chamber, the second set of tubes receiving said heating elements during the regenerating cycle for conducting heat into said drying agent, thereby regenerating said drying agent located in said adsorption chamber.

15. In apparatus as set forth in claim 14, said regenerating unit being mounted for movement on said frame and being movable relative to the adsorption chamber when it is fixed on said frame for regeneration thereof, wherein said heating elements are movable into their corresponding tubes, and means for circulating a purge gas through said adsorption chamber during the regeneration cycle.

16. In apparatus as set forth in claim 15, said frame including abutment means against which the valve assembly of the adsorption chamber is engaged when the adsorption chamber is mounted on said frame, wherein said adsorption chamber valve assembly is opened to provide for communication of said adsorption chamber with said purge gas.

17. In apparatus for regenerating an adsorption chamber having a drying agent located therein, a frame on which said adsorption chamber is removably mounted in fixed position during the regeneration thereof, track means located on said frame, a regenerating unit mounted for sliding movement on said track means relative to said fixed adsorption chamber between a regenerating position and a non-operating position, said regenerating unit including a plurality of heating elements that are directed toward the fixed adsorption chamber and are received in tubes located therein when said regenerating unit is slidably moved on said track means to the regenerating position, wherein the drying agent located in said adsorption chamber is effectively regenerated.

18. In a drying chamber for use in removing moisture and impurities from an atmosphere, a first compartment through which said atmosphere is circulated in a first direction, a second compartment separated from said first compartment except at one end thereof and receiving the circulating atmosphere by way of said one end, wherein the atmosphere is passed through said second compartment in a direction counter to the flow in said first compartment, a first set of finned tubes extending through said first compartment for removing the heat of compression of the circulating atmosphere, a second set of finned tubes located in the second compartment for conducting heat into and out of a drying agent located in said second compartment, said heat removing moisture and impurities from the atmosphere circulating through said chamber, and valve assemblies located at a common end of said compartments for controlling the flow of the atmosphere through ports located therein.

19. In a drying chamber as set forth in claim 18, each of said valve assemblies including a valve gate, a valve stem joined to said valve gate and a spring member interconnected to said stem and acting to normally retain said valve gate in a closed position with respect to the port with which it is associated, said valve stem being movable into engagement with an adjacent abutment when the drying chamber is placed in operation, wherein said stem is movable against the action of said spring to open the gate relative to the associated port.

References Cited
UNITED STATES PATENTS

| | | | |
|---|---|---|---|
| 1,189,383 | 7/1916 | Potter | 34—104 |
| 1,596,060 | 8/1926 | Mase | 55—35 |
| 2,440,043 | 4/1948 | Gould | 34—87 |
| 2,478,393 | 8/1949 | Haarmann | 34—80 |
| 2,884,855 | 5/1959 | Koch | 34—80 X |
| 3,068,587 | 12/1962 | Toellner | 34—80 X |
| 3,092,477 | 6/1963 | Persson | 34—80 X |
| 3,224,168 | 12/1965 | Gregory | 55—208 |
| 3,304,623 | 2/1967 | Reiss et al. | 34—80 |

FREDERICK L. MATTESON, JR., *Primary Examiner.*

A. D. HERRMANN, *Assistant Examiner.*